Oct. 12, 1965    A. A. BULL    3,211,292
STRAINER WITH CONCENTRIC FILTER ELEMENTS
Original Filed Sept. 19, 1961    2 Sheets-Sheet 1
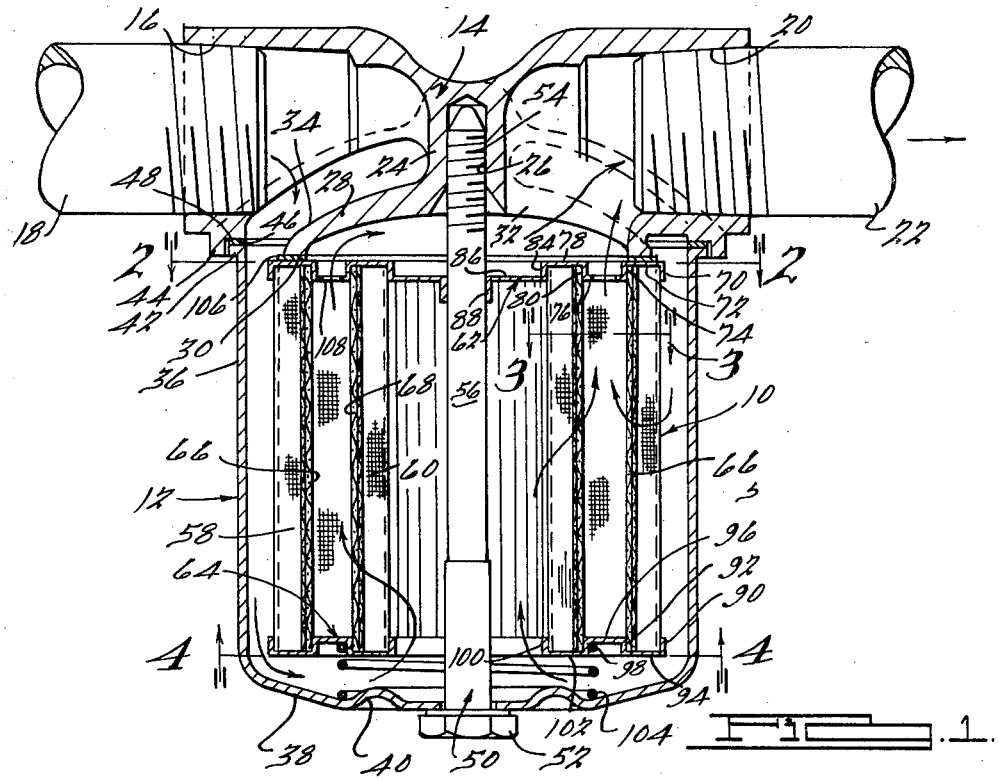
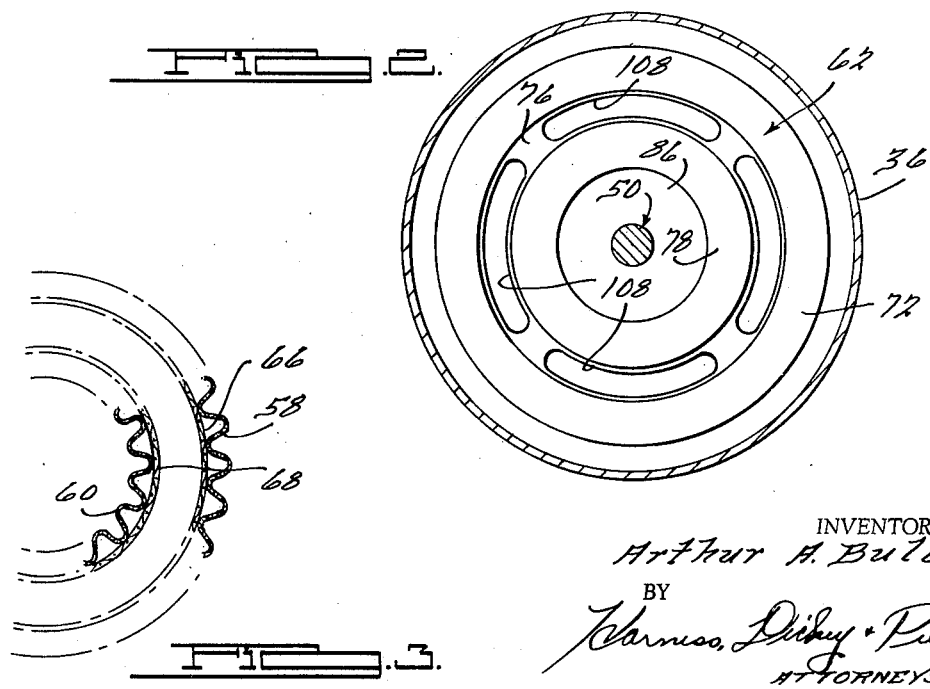
INVENTOR.
Arthur A. Bull.
BY
Harness, Dickey & Pierce
ATTORNEYS

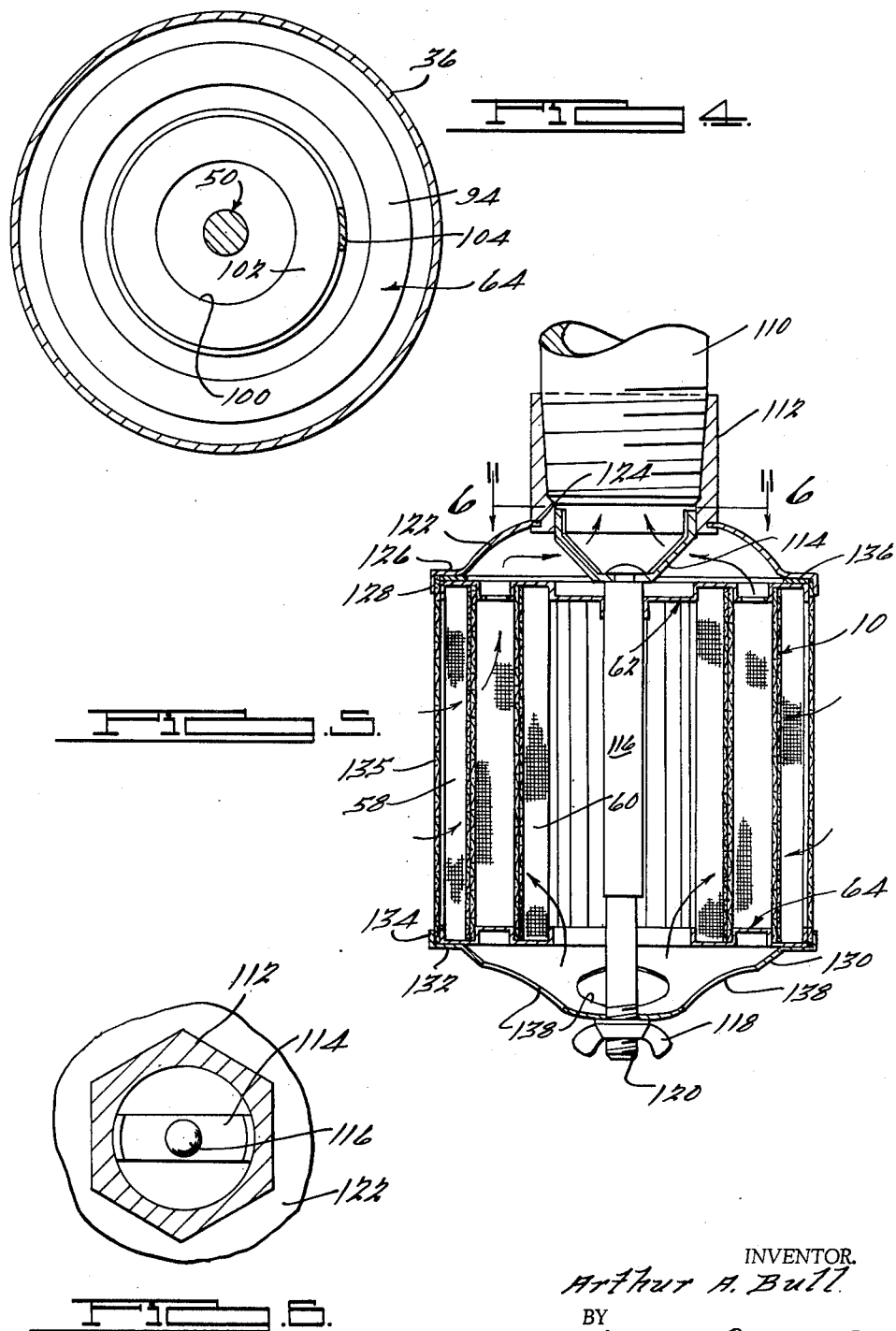

United States Patent Office 3,211,292
Patented Oct. 12, 1965

3,211,292
STRAINER WITH CONCENTRIC
FILTER ELEMENTS
Arthur A. Bull, Birmingham, Mich., assignor to Michigan-Dynamics, Inc., Detroit, Mich., a corporation of Michigan
Continuation of application Ser. No. 139,169, Sept. 19, 1961. This application Oct. 21, 1963, Ser. No. 320,601
1 Claim. (Cl. 210—342)

The present application is a continuation of my prior copending application, Serial Number 139,169, filed September 19, 1961, now abandoned, and assigned to the same assignee as the present invention.

This invention relates to strainers and particularly to a strainer for filtering contaminant particles or the like from a circulating liquid.

It is an object of the present invention to provide a strainer which is particularly suited for use in the hydraulic systems of machine tools, pumps or the like, and which is operable to entrap undesired solid particles or other contaminating matter and prevent the circulation of the same with the fluid.

It is another object of the present invention to provide a strainer of the above character incorporating filtering elements through which the liquid to be filtered is passed and in which the filtering elements possess a relatively large surface area compared to the overall size of the unit.

It is still another object of the present invention to provide a strainer in which the filter elements are incorporated within a removable cartridge, which may be readily removed from the filter unit and which is properly held in position in its housing by a centering and biasing spring.

It is a further object of the present invention to provide a cleanable cartridge for a strainer unit which is centrally hollow and which has filtering elements arranged in concentrically spaced relation to provide for the flow of liquid through the cartridge from either the inside or the outside periphery thereof.

It is still another object of the present invention to provide a strainer of the above type which is ruggedly constructed, inexpensive to fabricate and reliable in operation.

These and other objects of the invention will become apparent from the following detailed description taken in conjunction with the accompanying drawings wherein:

FIGURE 1 is a vertical sectional view of a strainer embodying the principles of the present invention;

FIG. 2 is a sectional view of the structure illustrated in FIGURE 1, taken along the line 2—2 thereof;

FIG. 3 is a sectional view of the structure illustrated in FIGURE 1, taken along the line 3—3 thereof;

FIG. 4 is a sectional view of the structure illustrated in FIGURE 1, taken along the line 4—4 thereof;

FIG. 5 is a vertical sectional view of the removable cartridge of FIGS. 1–4 shown in association with a modified form of housing; and FIG. 6 is a sectional view of the structure illustrated in FIG. 5, taken along the line 6—6 thereof.

Referring now to FIGURE 1, the strainer will be seen to include a removable filter cartridge 10 disposed within a housing or bowl member 12. The housing 12 is closed at its open end by a header or housing member 14 which cooperates with both the housing member 12 and the filter cartridge to direct incoming contaminated liquid through the filter cartridge 10 and to carry away the clean liquid after it has passed through the filter cartridge.

The header 14 has an inlet opening 16 connected to an inlet pipe or conduit 18 and an outlet opening 20 connected to an outlet pipe or conduit 22. The inlet and outlet openings 16 and 20 are arranged on opposite sides of a central hub portion 24 which is provided with a threaded blind bore 26 open to the bowl 12. A wall 28 extends radially outwardly and downwardly from the inner side of the hub 24 and terminates in an annular shoulder 30 extending perpendicularly to the longitudinal axis of the unit. The wall 28 is continuous except for an opening 32 which is formed therein and communicates with the outlet opening 20. Disposed immediately above the wall 28 is a cavity 34 which communicates with the inlet opening 16 and extends entirely about the hub 24 except for the material of the header 14 defining the opening 32.

The bowl or housing 12 includes a circular side wall 36 and a centrally apertured bottom wall 38 having an inwardly indented annular rib 40 concentric with the side wall 36. An upper end 42 of the side wall 36 is fitted within a cylindrical lip 44 depending from the header 14 and is drawn against an annular shoulder 46 on the header with a gasket 48 interposed therebetween. The housing member 12 is maintained in assembly with the header 14 by means of a central spindle in the form of a bolt 50 having a head 52 disposed on the outer side of the bottom wall 38 and a threaded end portion 54 threaded into the bore 26 of the hub 24. An elongated shank portion 56 of the bolt 50 extends through the cartridge 10 for the entire length thereof. The arrangement of parts is such that liquid entering the device through the conduit 18 is free to flow through the inlet opening 16 into the cavity 34 and thence into the housing 12 through the annular space between the header shoulder 30 and the upper end 42 of the housing 12. It will be seen that the side wall 36 of the housing 12 is sufficiently larger than the cartridge to provide an open space permitting the incoming liquid to flow down the length of the outer periphery of the cartridge to the bottom of the housing 12 and then upwardly to the hollow interior of the cartridge around the shank 56.

The cartridge 10 includes a pair of concentric corrugated filtering elements 58 and 60 which are continuous in construction and extend in a sinuous generally annular path. A pair of retainer elements 62 and 64 are positioned at the opposite ends of the cartridge 10 and serve to hold the elements 58 and 60 in fixed relation relative to one another. The filter elements 58 and 60 are preferably formed from woven wire cloth of any desired weave but of sufficient fineness to perform the desired filtering function. The relatively fine and delicate material of the filtering elements 58 and 60 is desirably reinforced by supplementary porous supporting elements 66 and 68 of a relatively coarse woven wire cloth. The supporting elements 66 and 68 are circular cylindrical in shape and engage the filtering elements 58 and 60 on the inner and outer diameters thereof, respectively.

The retainer elements 62 and 64 will be seen to be of a stepped configuration to define aligned oppositely facing pockets or grooves receiving the opposite ends of the filtering elements 58 and 60 and their supporting elements 66 and 68. The retainer element 62 in particular is formed to provide an outer axially extending cylindrical flange 70 which cooperates with an adjacent annular flat wall portion 72 and a cylindrical shoulder 74 to define an outer groove. A raised annular portion 76 is disposed radially inwardly of the portion 72 to define an inner annular groove having an annular bottom wall portion 78 and bounded by cylindrical shoulders 80 and 84. The retainer 62 has an annular wall 86 extending radially inwardly from the shoulder 84 to the shank 56 and terminating in a cylindrical flange 88 snugly fitting on the shank 56. The wall 86 and its flange 88 cooperate with the bolt shank 56 to close the upper end of the hollow cartridge interior radially inwardly of the element 60 and also to properly align the upper end of the cartridge 10.

The retainer element 64 includes a circumferential outer flange 90 and a circumferential shoulder 92 defining therebetween an outer groove having an annular bottom wall 94. A raised annular wall 96 extends radially inwardly of the shoulder 92 to a cylindrical shoulder 98. An annular flange 100 is spaced inwardly of the shoulder 98 and defines therewith an inner annular groove having an annular bottom wall 102. The filtering element 58 and its supporting element 66 are supported at one end thereof within the outer groove defined by the flange 70, annular wall 72 and shoulder 74 of the retainer 62 and at the other end thereof within the groove defined by the flange 90, the annular wall 94 and shoulder 92 of the retainer 64. The filter element 60 and its supporting element 68 are supported within the inner groove defined by the shoulders 80 and 84 and the annular wall 78 of the retainer 62 at one end thereof and the groove defined by the shoulder 98, flange 100 and annular wall 102 of the retainer element 64 at the opposite end thereof. Each of the filtering elements and their supporting screens are preferably bonded in place in said pockets as by brazing, soldering or the use of epoxy resin cements. Thus, the cartridge 10 may be handled during cleaning or the like without danger of its several parts becoming disassembled.

When positioned over the bolt shank 56 within the bowl 12, the cartridge 10 rests upon a helical spring 104 which is located on the bottom wall of the housing 38 by the annular rib 40 and which seats within a groove in the retainer member 64 defined by the annular wall 96 and the shoulders 92 and 98. When the bolt 50 is threaded into the hub, the spring 104 will exert a biasing force on the cartridge, urging the annular wall 72 of the retainer element 62 against a gasket 106 positioned on the header shoulder 30. Thus, incoming liquid is forced to travel in the path indicated by the arrows of FIGURE 1. Liquid entering the bowl 12 is free to flow through the filter element 58 into the annular space between the supporting members 66 and 68 or downwardly around the cartridge 10 to the bottom of the bowl, up into the hollow interior of the cartridge 10 and then through the filter element 60 to the annular space between the supporting elements 66 and 68. Arcuately shaped openings 108 in the annular wall portion 76 permit the escape of the clean liquid to the area above the cartridge and bounded by the shoulder 30. From this area, the clean liquid will flow through the opening 32 to the inlet opening 20 and then to the outlet conduit 22.

The manner of disassembly of the filter for removal of the cartridge 10 is readily apparent. The bolt 50 is merely unscrewed to permit the bowl 12 to be separated from the header 14. The cartridge 10 may then be lifted out of the bowl 12 for servicing or cleaning. It will be seen that all of the contaminant will be deposited on the exposed surfaces of the filtering elements 58 and 60 at the outer and the inner periphery of the cartridge where it is readily accessible to a cleaning liquid or brush. Thus, the contaminant may be removed from the cartridge in a highly expeditious manner and the cartridge 10 thereafter reinstalled in the device for continued service.

The structure of FIGS. 1–4 is intended for use in a system in which the header 14 may be conveniently coupled or inserted in a fluid carrying line or conduit. FIGS. 5 and 6 show a modified form of the present invention in which the identical cartridge 10 is supported in a modified structure adapted for connection to a suction conduit or line 110 extending down into a tank or other container (not shown) forming a place of storage for the fluid to be cleaned. In such location, the normal level of the fluid within the container will keep the cartridge 10 entirely immersed in the liquid. As shown in FIG. 5, the supporting structure for the cartridge includes a fitting or sleeve 112 threaded onto the end of the suction line 110. A generally U-shaped clip 114 is positioned with its upper ends welded or otherwise secured within the open lower end of the fitting 112. A spindle 116 has its upper end connected to the bottom of the clip 114 and is provided with a wing nut 118 at its threaded lower end 120. A housing or cap member 122 of inverted bowl shape has its inner marginal edge 124 seated within a groove formed on the outer diameter of the fitting 112 and is provided with an annular radially extending shoulder 126 adjacent its outer and lower end terminating in a cylindrical flange 128. A bracket 130 is supported by the wing nut 118 and has a shoulder 132 engaging the lower end of the cartridge 10. An upstanding cylindrical flange 134 is formed on the outer edge of the shoulder 132 to snugly receive a cylindrical porous housing member 135. The member 135 is preferably constructed of coarse wire screen and snugly surrounds the cartridge. Furthermore, the member 135 is just slightly longer than the cartridge 10 so that when the nut 118 is tightened the member 135 will be clamped between the shoulders 132 and 126 while the cartridge 10 will be drawn against a gasket 136, which is positioned against the shoulder 126. The bracket 130 is provided with openings 138 to permit the entrance of liquid therethrough to the inner diameter of the cartridge, so that liquid is free to flow either up to the hollow interior of the cartridge and through the inner filtering element 60 or through the member 135 and the outer filtering element 58. In either case, the clean liquid is free to flow from the space between the filtering elements 58 and 60 up through the upper retainer element 62 to the space enclosed by the cap 122 and then past the U-shaped clip 114 to the interior of the fitting 112 and suction line 110. While the cartridge supporting elements 66 and 68 have the shape of a right circular cylinder, it will be seen that the filtering elements 58 and 60 are also "cylindrical" in the broadest sense of the word. That is, they have a shape generated by a first straight line moved about a second straight but fixed line to which it is kept parallel. When used without a modifying adjective in the appended claim, the term "cylindrical" is used in this broad sense.

While it will be apparent that the preferred embodiments herein illustrated are well calculated to fulfill the objects above stated, it will be appreciated that the invention is susceptible to modification, variation and change without departing from the proper scope or fair meaning of the subjoined claim.

What is claimed is:

A strainer unit including a header having a fluid inlet opening and a fluid outlet opening, a housing connected to said header and defining therewith an inlet cavity in communication with said inlet opening and an outlet cavity defined by an annular shoulder on said header communicating interiorly with the outlet opening and exteriorly with the inlet opening located between said inlet and outlet openings, a cartridge disposed in said inlet cavity having a pair of cylindrical filtering elements and a pair of retainer members located one at each end of said filtering elements, said retainer members being secured to said filtering elements to maintain the same in fixed spaced concentric relationship, one of said retainer members comprising a formed sheet of generally uniform thickness having a pair of concentric first and second grooves receiving an adjacent pair of ends of said filtering elements and a third groove facing in a direction opposite from said first and second grooves and located between said first and second grooves, said third groove having an imperforate bottom wall closing the space between said filter elements at one end thereof, the other of said retainer members being sealed against said shoulder and perforated in a location between said filter elements which perforations are in direct communication with said outlet opening when said other retainer member is held against said header shoulder, and a spring coil seated in said third groove of said one retainer member and operable to bias said cartridge against said header shoulder and locating means on said housing engageable with said spring for limiting lateral movement of said spring with respect to said housing.

References Cited by the Examiner

UNITED STATES PATENTS

| | | | |
|---|---|---|---|
| 590,968 | 10/97 | Davis | 210—342 X |
| 2,301,120 | 11/42 | Kamrath | 210—443 |
| 2,382,278 | 8/45 | Widman | 210—443 |
| 2,521,107 | 9/50 | Wiley | 210—443 X |
| 2,926,787 | 3/60 | Combest | 210—444 X |
| 3,045,826 | 7/62 | Howard et al. | 210—443 X |

FOREIGN PATENTS

| | | |
|---|---|---|
| 473,224 | 10/37 | Great Britain. |
| 262,264 | 6/49 | Switzerland. |

REUBEN FRIEDMAN, *Primary Examiner*.